United States Patent
Bergström et al.

(10) Patent No.: US 8,938,318 B2
(45) Date of Patent: Jan. 20, 2015

(54) METHOD AND SYSTEM FOR NAVIGATING A ROBOTIC GARDEN TOOL

(75) Inventors: Jonas Bergström, Malmbäck (SE); Stefan Strandberg, Jönköping (SE); Patrik Jägenstedt, Tenhult (SE); Mattias Kamfors, Jönköping (SE)

(73) Assignee: Husqvarna AB, Huskvarna (SE)

( * ) Notice: Subject to any disclaimer, the term of this patent is extended or adjusted under 35 U.S.C. 154(b) by 299 days.

(21) Appl. No.: 13/634,974

(22) PCT Filed: Mar. 17, 2011

(86) PCT No.: PCT/SE2011/050291
§ 371 (c)(1),
(2), (4) Date: Sep. 14, 2012

(87) PCT Pub. No.: WO2011/115563
PCT Pub. Date: Sep. 22, 2011

(65) Prior Publication Data
US 2013/0006419 A1 Jan. 3, 2013

(30) Foreign Application Priority Data
Mar. 17, 2010 (SE) .................. PCT/SE2010/050293

(51) Int. Cl.
*G06F 19/00* (2011.01)
(52) U.S. Cl.
USPC .............. 700/258; 701/25; 701/409; 356/614
(58) Field of Classification Search
USPC ............. 700/258, 245, 400, 408, 409, 25, 23; 356/614; 56/10.1, 10.2 D; 901/1
See application file for complete search history.

(56) References Cited

U.S. PATENT DOCUMENTS

| | | |
|---|---|---|
| 5,086,535 A | 2/1992 | Grossmeyer et al. |
| 5,204,814 A | 4/1993 | Noonan et al. |

(Continued)

FOREIGN PATENT DOCUMENTS

WO 9912793 A1 3/1999

OTHER PUBLICATIONS

International Search Report and Written Opinion of PCT/SE2010/050293 mailed Dec. 8, 2010.

(Continued)

*Primary Examiner* — Ronnie Mancho
(74) *Attorney, Agent, or Firm* — Nelson Mullins Riley & Scarborough LLP (57) ABSTRACT

The present invention relates to a method (300) and a system (100) for navigating a robotic garden tool (202) based on one or more operating parameters for subareas (210-218) within the working area (204) and a current location of the robotic garden tool (202). The working area (204) is provided with a signal source (104) corresponding to which a sensor unit (106) is provided in the robotic garden tool (202) for detecting the one or more signals (102) from the signal source (104). The robotic garden tool (202) may include a low-accuracy positioning device (110) for providing co-ordinates of various subareas (210-218) and at any given instant, an approximate location of the robotic garden tool (202). The robotic garden tool (202) further includes a processor means (114) for comparing the coordinates of the subareas (210-218) and the approximate position of the robotic garden tool (202) to determine a current location of the robotic garden tool (202) in the working area (204).

20 Claims, 3 Drawing Sheets

(56) References Cited

U.S. PATENT DOCUMENTS

| | | | |
|---|---|---|---|
| 6,255,793 | B1 | 7/2001 | Peless et al. |
| 6,338,013 | B1 * | 1/2002 | Ruffner .................. 701/23 |
| 6,480,768 | B1 | 11/2002 | Torii |
| 6,502,017 | B2 * | 12/2002 | Ruffner .................. 701/23 |
| 6,650,975 | B2 * | 11/2003 | Ruffner .................. 701/23 |
| 7,343,230 | B2 | 3/2008 | McMurtry et al. |
| 7,499,155 | B2 * | 3/2009 | Cappelletti ............ 356/141.3 |
| 8,428,776 | B2 * | 4/2013 | Letsky ................... 700/245 |
| 8,634,960 | B2 * | 1/2014 | Sandin et al. ........... 700/258 |
| 8,744,626 | B2 * | 6/2014 | Johnson et al. ......... 700/250 |
| 2003/0144774 | A1 | 7/2003 | Trissel et al. |
| 2008/0039991 | A1 | 2/2008 | May et al. |
| 2008/0049217 | A1 * | 2/2008 | Cappelletti ............ 356/141.3 |
| 2010/0324731 | A1 * | 12/2010 | Letsky ................... 700/245 |
| 2011/0295424 | A1 * | 12/2011 | Johnson et al. ......... 700/248 |

OTHER PUBLICATIONS

Chapter I International Preliminary Report on Patentability of PCT/SE2010/050293 mailed Sep. 18, 2012.

International Search Report and Written Opinion of PCT/SE2011/050291 mailed May 24, 2011.

Chapter II International Preliminary Report on Patentability of PCT/SE2011/050291 mailed Apr. 17, 2012.

Cocco, Jeremy, et al., "UEzMow2 Autonomous Lawnmower," University of Evansville, May 15, 2008.

Shiu, Bing-Min, et al., "Design of an Autonomous Lawn Mower with Optimal Route Planning," Department of Electrical Engineering, National Chung Hsing University, Taiwan, R.O.C., 2008.

"The Lawn Ranger," Perspectives Autumn / Winter 2005 edition, pp. 32-33.

* cited by examiner

METHOD AND SYSTEM FOR NAVIGATING A ROBOTIC GARDEN TOOL

TECHNICAL FIELD

The present invention relates to a robotic garden tool. In particular, the present invention relates to method and system for navigating the robotic garden tool.

BACKGROUND

The robotic garden tools, such as, but not limited to robotic lawnmowers are widely used for grass cutting applications in a lawn. As these robotic garden tools are autonomous, they have to navigate and keep a track of the areas they have performed operations upon. This is particularly important for the case in which the area to be mowed is very large. If the robotic garden tool does not keep the track of the locations it has performed operations upon and which are the remaining locations, then it may take long time to complete the operation in the whole area.

Normally wires are used to generate reference signals for the robotic garden tool to navigate the robotic garden tool in the lawn. But, the problem with such a system is that the signals generated may not provide any location based information as to where the robotic garden tool currently is. Also, these signals do not provide information as to whether a particular area is mowed and thus it might be possible that the robotic garden tool may mow a particular area multiple times, leading to inefficiency of the complete system.

The technique currently used to avoid the above mentioned problem is the use of navigation systems, such as, Global Positioning System (GPS). The GPS system may provide accurate data as to where the robotic garden tool is, the areas it has performed operations upon, areas remaining, etc. But the problem associated with such system is that it needs expensive GPS trans-receiver to be mounted on the robotic garden tool. Also, the interconnection between the GPS module and the other parts of the robotic garden tool adds to the complexity and the cost of the whole system. Further, if the contact to the GPS system is lost the robotic garden tool may not know its working area limits and might go off boundary.

In light of the foregoing, there is a need for an improved method for navigating the robotic garden tool in the lawn area, which will overcome the disadvantages of complex integration, increased cost, flexibility in cutting, along with optimally providing location based data.

SUMMARY

In view of the above, it is an objective of the present invention to solve or at least reduce the problems discussed above. In particular, the objective is to provide a method and a system for navigating a robotic garden tool without complex integration.

The objective is at least partly achieved according to the novel method described in claim 1 for navigating a robotic garden tool. The robotic garden tool may operate in a lawn, which has a predetermined working area. Further, the working area may be defined by means of boundaries. The robotic garden tool may include at least one sensor unit to detect the boundaries. Further, the robotic garden tool may be adapted to operate in the working area in an irregular pattern. In an aspect of the present invention, in order to keep the uneven geography in the account, the working area may be divided into various subareas. Further, the robotic garden tool may be provided with a low-accuracy positioning device to define the various subareas based on the coordinates that may be received by the robotic garden tool, for the subareas, from the low-accuracy positioning device. The robotic garden tool may store the co-ordinates of the subareas in a memory means. Further, the robotic garden tool may also receive coordinates for an approximate position of the robotic garden tool from the low-accuracy positioning device. In an aspect of the present invention, the robotic garden tool may be provided with a processor means for comparing the stored coordinates for the subareas with the coordinates for an approximate position of the robotic garden tool from the low-accuracy positioning device and thus, determine in which subarea the robotic garden tool is at present. In an aspect of the present invention, the use of a low-accuracy positioning device may reduce the complexity of integrating an accurate system, as the system does not require a high-accuracy GPS device. Further, this may also reduce the overall cost of the system.

According to claim 2, the robotic garden tool may be provided with one or more operating parameters for each of the subareas. In an aspect of the present invention, the operating parameters may enable to define the various subareas as explained in claims 3-7. By providing the robotic garden tool with operating parameters for each of the subareas, a better operation may be performed by the garden tool. When the robotic garden tool is a robotic lawn mower, the subareas in the lawn may be cut with different parameters providing a lawn cut more precisely according to the wishes of the lawn owner.

According to claim 3, the one or more operating parameters may include cutting heights for each of the subareas. According to claim 4, the one or more operating parameters may include a specific time at which each of the subareas is to be cut. According to claim 5 and 6, the one or more operating parameters may include an order in which the subareas is to be cut or define a time interval between successive cuttings for each of the subareas. According to claim 7, the one or more operating parameters may include restricting the access of the robotic garden tool to different subareas at different times.

According to claim 8, the robotic garden tool may be adapted to generate a low-accuracy map of the working area based on the coordinates for the subareas and the boundaries.

According to claim 9, the robotic garden tool may be adapted to use the generated map to find a remote area within the working area and/or a charging station within the working area. Further, the map may also enable the robotic garden tool to find the shortest path to reach the remote area or the charging station. Thereby, the robotic garden tool may itself keep track of its approximate location within the working area, providing the possibility to navigate to a certain remote area or location.

According to claim 10, the boundaries may define the working area by means of physical fences, fixed objects, a boundary wire, which boundary wire sends electrical signals, and/or through surface determination. Thereby, the outer boundary of the working area may be defined, without using the low-accuracy positioning device.

According to claim 11, the robotic garden tool may be adapted to perform irregular operation within a subarea before continuing to another subarea within the working area.

According to claim 12, in another aspect of the invention, a system may be provided for navigating the robotic garden tool, which may operate in a lawn within a predetermined working area. The working area may be divided into various subareas based on one or more parameters for the subareas and the geography of the working area. The robotic garden tool may be adapted to operate in the working area in an irregular pattern. The system may include a signal source which is adapted to send one or more signals for defining the boundaries of the working area. The system may further include at least one sensor unit to detect the boundaries based on the one or more signals provided by the signal source. Further, the system may include a low-accuracy positioning device for defining the subareas based on the coordinates from the low-accuracy positioning device. The low-accuracy local positioning device may further be adapted to provide an approximate position of the robotic garden tool in a subarea. The system may also be provided with a control unit provided on the robotic garden tool. The control unit may further include at least one processor means and a memory means. In an aspect of the present invention, the processor means may be adapted to compare the coordinates for the subareas with the coordinates for an approximate position of the robotic garden tool from the low-accuracy positioning device and thus, determine in which subarea the robotic garden tool is at present.

According to claim 13, the control unit may be adapted to generate a map based on the coordinates from the low-accuracy positioning device and the one or more signals received from the signal source.

According to claim 14, the control unit may further be adapted to generate one or more commands based at least in part on the location of the robotic garden tool.

According to claim 15, the low-accuracy positioning device may be a standard GPS device.

According to claim 16, the accuracy of the low-accuracy positioning device may be less than ±10 m. According to claim 17, the accuracy may be less than ±3 m. According to claim 18, the accuracy may be ±1 m. According to claim 19, the accuracy may be less than ±0.1 m.

According to claim 20, the robotic garden tool may be a robotic lawnmower.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

Figure 1:
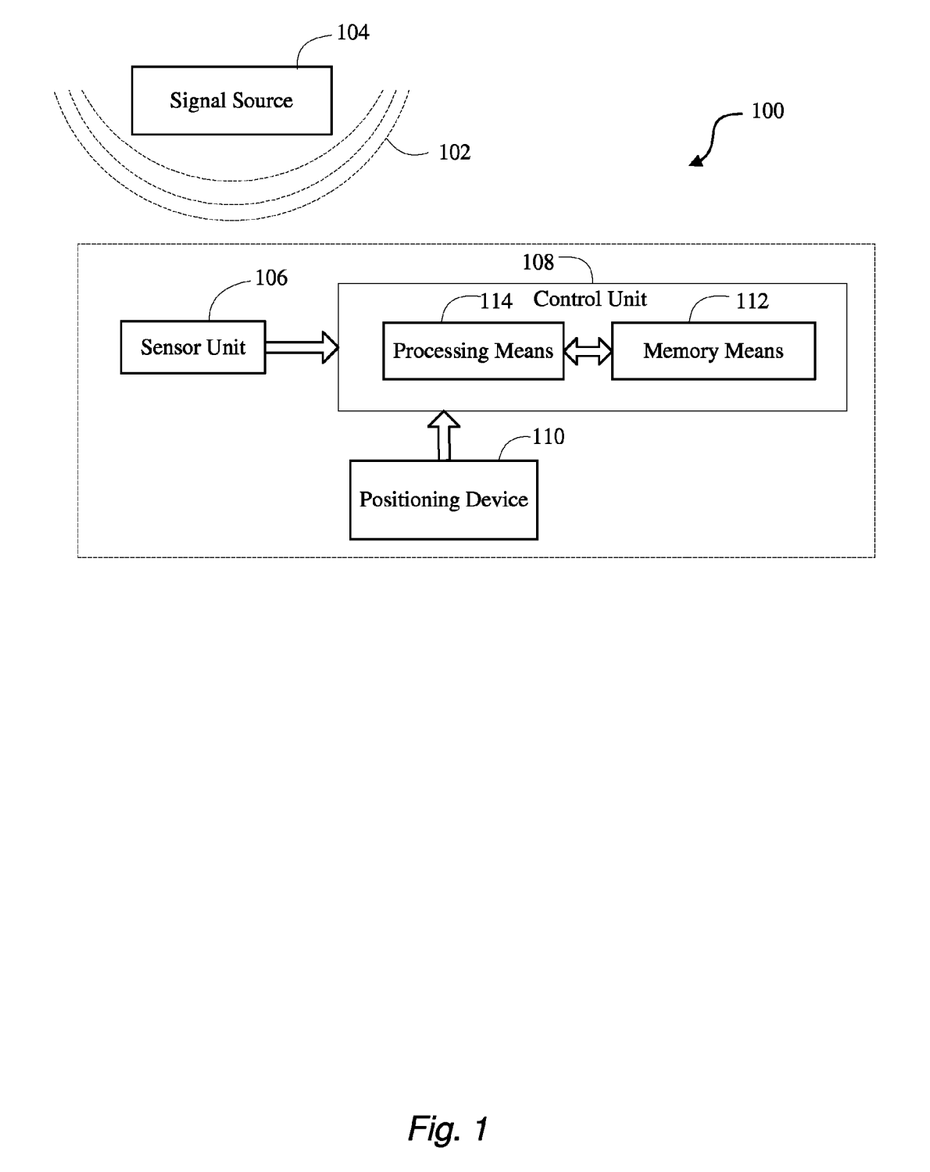
FIG. 1 illustrates a system for navigating a robotic garden tool, according to an embodiment of the present invention.

FIG. 1 illustrates a block diagram of a system 100, according to an embodiment of the present invention. In an embodiment of the present invention, the system 100 may be embodied in a robotic garden tool for navigating the robotic garden tool around the lawn to be mowed. In an embodiment of the present invention, the robotic garden tool may be adapted to operate in a working area of the lawn in an irregular pattern. In various embodiments of the present invention, the robotic garden tool may be a robotic lawn mower. However, it is apparent to a person who is ordinarily skilled in the art that the system 100 may also be embodied in any another equipment, such as, but not limited to an automated vacuum cleaner or any other autonomous robotic tool without departing from the scope of the present invention.

In various embodiments of the present invention, the working area of the lawn may be divided into various subareas. Further, in an embodiment of the present invention, the working area of the lawn may be defined by boundaries. In an embodiment of the present invention the boundary may define the working area by means of physical fences, fixed objects, surface determination, a boundary wire and the like. In various embodiments of the present invention, the boundaries may be identified based on one or more signals 102 generated from a signal source 104. In an embodiment of the present invention, the signal source 104 may be a wire, in particular a boundary wire spread along the perimeter of the working area in the lawn.

As shown in FIG. 1, the robotic garden tool includes a sensor unit 106, which is adapted to detect the one or more signals 102 from the signal source 104, as well as other physical objects like fences or fixed objects present in the lawn. In an embodiment of the present invention, the one or more signals 102 include magnetic field signals or electrical current signals from the boundary wire. The sensor unit 106 further includes one or more sensors, such as, but not limited to, a magnetic field sensor, a current sensor, proximity sensor or photoelectric sensor. The sensor unit 106 is positioned at a front portion of the robotic garden tool. In another embodiment of the present invention, the sensors may be positioned at any suitable location on the robotic garden tool.

The sensor unit 106 converts the one or more signals 102 into equivalent electrical signals. Further, the sensor unit 106 provides the converted equivalent electric signals to a control unit 108, provided in the robotic garden tool, for further processing.

Further as shown in FIG. 1, the system 100 includes a low-accuracy positioning device 110 (herein after referred to as positioning device 110) in the robotic garden tool. In an embodiment of the present invention, the positioning device 110 may be a standard low-accuracy Global Positioning System (GPS). In an embodiment of the present invention, the positioning device 110 may be a Local Positioning System. In various embodiments of the present invention, the positioning device 110 may be any device which is capable of providing location based information to the robotic garden tool. In an embodiment of the present invention, the accuracy of the positioning device 110 may be ±10 m. In another embodiment of the present invention, the accuracy of the positioning device 110 may be ±3 m. In another embodiment of the present invention, the accuracy of the positioning device 110 may be ±1 m. In yet another embodiment of the present invention, the accuracy of the positioning device 110 may be ±0.1 m.

The positioning device 110 is adapted to provide position co-ordinates of the working area, which is divided into various subareas, to the control unit 108. The position co-ordinates define the various subareas within the working area. Further, the positioning device 110 is also adapted to provide coordinates for an approximate position of the robotic garden tool to the control unit 108.

As shown in FIG. 1, the control unit 108 further includes a memory means 112 and a processing means 114. The control unit 108 stores the position co-ordinates of the subareas, provided by the positioning device 110, and the converted equivalent electric signals, provided by the sensor unit 106, in the memory means 112 and/or provide them directly to the processing unit 114.

The memory means 112 may be a Random Access Memory (RAM), Read Only Memory (ROM), flash memory or any suitable storage equipment. The memory means 112 may include various modules for storing operating instructions and other software of the control unit 108. The operating instructions may be a set of computer executable instructions for controlling the overall operations of the control unit 108. The memory means 112 also stores a database of parameters required to send a command to the robotic garden tool based on one or more signals received from the sensor unit 106 and the positioning device 110. The parameters may also include geometry of the lawn or field, strength of the detected signals, types of detected signals etc. The one or more parameters from the memory means 112 are communicated to the processing means 114 for further processing.

The processing means 114 performs all the computations required to navigate robotic garden tool in different areas of the lawn. The processing means 114 includes an input/output (I/O) interface (not shown), which is operable for receiving the parameters and the computer executable instructions from the memory means 112. The processing means 114 also obtains the converted electrical signals from the sensor unit 106 through the I/O interface. In another embodiment of the present invention, the processing means 114 also obtains position co-ordinates from the positioning device 110 through the I/O interface.

The processing means 114 generates a map of the lawn based on the electric signals from the sensor unit 106 and the position co-ordinates of the various subareas within the working area, from the positioning device 110.

The processor means 114 also receives co-ordinates for an approximate position of the robotic garden tool from the positioning device 110. Further, the processor means 114 compares the position co-ordinates of the subareas, based on which the map is generated, and the received approximate position of the robotic garden tool to determine a location of the robotic garden tool or especially in which subarea the robotic garden tool is at present. The processor means 114 generates one or more commands based at least in part on the location of the garden tool in the lawn.

The one or more commands are based on various operating parameters defined for each of the subareas in the lawn. The operating parameters are stored in the memory means 112. The operating parameters may include, but not limited to different cutting heights, certain order in which the subareas should be cut, a specific time in which a subarea should be cut, intervals at which a certain subarea should be cut, restricting the entry of the robotic garden tool in certain subareas at certain times and the like.

The control unit 108 is adapted to use the generated map and the current location of the robotic garden tool to find a remote area where the robotic garden tool should be moved. In an embodiment of the present invention, the remote area may be a charging station for the robotic garden tool, when the battery of the robotic garden tool falls below a pre-determined threshold.

Figure 2:
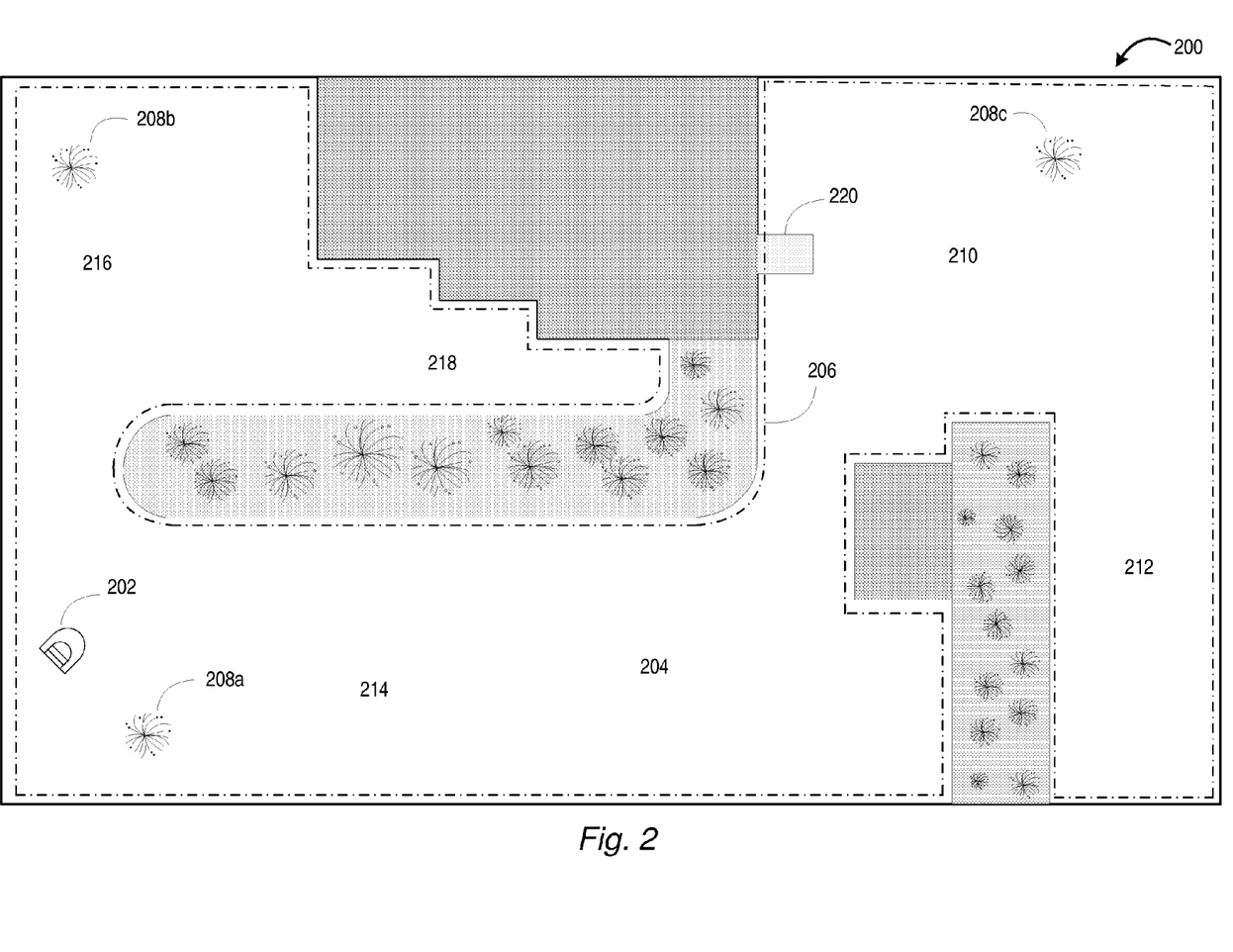
FIG. 2 illustrates an exemplary lawn, according to an embodiment of the present invention.

FIG. 2 illustrates a schematic diagram of a lawn 200 for a robotic garden tool 202, according to an embodiment of the present invention. The robotic garden tool 202 is configured to perform irregular operation within a limited working area 204. The limited area may be any terrain with vegetation, such as lawns, gardens, yards, golf courses, fields, and the like.

The lawn 200 may include one or more boundaries which may define the working area 204. The signal source 104 is provided to delimit the boundary of the working area 204. In an embodiment of the present invention, the signal source 104 is a boundary wire 206 spread along the perimeter of the working area 204. The boundary wire 206 may be buried inside the ground. Further, the signal source 104 produces one or more signals 102 for the robotic garden tool 202. The one or more signals 102 may have particular characteristics associated with it, such as, but not limited to frequency, phase and strength.

The boundaries of the working area 204 may also be defined by fixed objects 208a, 208b, and 208c as shown in FIG. 2, fences (not shown) and the like. Further, the sensor unit 106 is mounted in the robotic garden tool 202, as explained in conjunction with FIG. 1, for detecting one or more signals 102 from the signal source 104 and thus identifying the boundaries of the working area 204.

To overcome the disadvantages of irregular geography of the working area 204, the working area 204 is divided into several subareas 210, 212, 214, 216, and 218 as shown in FIG. 2. To add the subareas based information in the robotic garden tool 202, the positioning device 110 is provided on the robotic garden tool 202. The positioning device 110 is used to define the coordinates of the subareas.

The control unit 108 provided in the robotic garden tool 202 is adapted to generate a basic map of the working area 204 based on the position co-ordinates of the subareas received from the positioning device 110 and the one or more converted electric signals received from the sensor unit 106.

The map may be created automatically. To create the map automatically, the position co-ordinates of the various subareas may be received from the positioning device 110 while the robotic garden tool 202 moves around the working area 204 in an irregular pattern, delimited by the boundary wire 206. In another embodiment of the present invention, the map may be created manually by an operator. To create the map manually, the robotic garden tool 202 may be placed in different subareas 210-218 on the working area 204 and then receiving the co-ordinates of the subareas 210-218 from the positioning device 110. The generated map is stored in the memory means 112 of the control unit 108.

The generated map may be modified automatically while the robotic garden tool 202 moves within the working area 204 delimited by the boundary wire 206. The map may consist of a grid structure and the robotic garden tool 202 counts the number of times it traverses through each square in the grid in order to maintain a grid counter. For updating the map and reducing the disturbances, each grid counter may be decremented with a fixed interval. Thus, by evaluating the grid counters, the control unit 108 navigates the robotic garden tool 202 in the working area 204.

At any given instant, the control unit 108 also receives coordinates of an approximate position of the robotic garden tool 202. Further, the processor means 114 provided in the control unit 108 compares the position co-ordinates of the subareas 210-218 from the map and the co-ordinates of the approximate position of the robotic garden tool 202 to determine a location of the robotic garden tool 202. Moreover, the processor means 114 also generates one or more commands based on the location of the robotic garden tool 202 or in which subarea the robotic garden tool 202 is at present.

The working area 204, delimited by the boundary wire 206. and/or by fixed objects 208a, 208b, and 208c, is very well defined. The accuracy of the boundary of the working area (the outermost point of the robotic garden tool 202) will be on a centimeter level. The inaccuracy occurring in a GPS receiver is principally stochastically distributed within a circle around the point where the robotic garden tool 202 is actually positioned. When information is collected over time regarding the positions the robotic garden tool 202 "thinks" it has been positioned, a map having quite fuzzy edges is obtained, which map includes also points outside of the real working area. Since the inaccuracy is stochastically distributed, the number of points outside of the boundary wire 206 will be far fewer than inside of the boundary wire 206. This means that by applying simple filters to the "raw" map, (such as a requirement that there should be a certain number of hits on a particular point for that point to be regarded as within the working area) a map having considerably higher accuracy than what is received by means of the direct GPS signal. Hence, a very accurate map may be obtained, although the robotic garden tool 202 does not know exactly where it is positioned.

The one or more commands are based at least in part on one or more operating parameters that may be pre-defined for each of the subareas 210-218. An operating parameter may define a specific height of the grass to be cut in a certain subarea. In another embodiment of the present invention, an operating parameter may be the priority or the order in which the subareas should be cut or may define a specific order in which the robotic garden tool 202 should cut the subareas 210-218. In another embodiment of the present invention, an operating parameter may define the time interval between successive mowing over a particular subarea. In an embodiment of the present invention, an operating parameter may be time and days on which each subarea should be mowed. In another embodiment of the present invention, an operating parameter may define criteria in which mowing over a certain subarea is restricted entirely or for a specific period of time. In still another embodiment of the present invention, an operating parameter may define the speed at which the robotic garden tool 202 may cut certain subareas 210-218. This may be helpful to reduce the speed of cutting where more obstacles are present or reducing the speed in narrower areas. Further, in an embodiment of the present invention, the various operating parameters may ensure that all subareas 210-218 are mowed as desired.

By selecting where the robotic garden tool 202 should start operating and by "instructing" the tool to turn around when it comes to an area which is already well cut, an evenly distributed mowing of the whole working area may be obtained. One way of ensuring that the entire working area is evenly cut is to instruct the robotic garden tool 202 to head for the subarea having the fewest number of hits, when it leaves the charging station. The robotic garden tool 202 will be able to reach that subarea since the generated map is so accurate. In this way, the robotic garden tool 202 will know with a fairly high accuracy how far it has to follow the boundary wire 206 in order to reach the part of the working area which has been visited the fewest number of times.

The generated map, the operating parameters and the approximate position of the robotic garden tool 202 enables the control unit 108 to navigate the robotic garden tool 202 to the charging station 220, when the battery level of the robotic garden tool falls below a predefined threshold. The control unit 108 is adapted to navigate the robotic garden tool 202 through the shortest path to the charging station 220.

An operating parameter may define a security feature in which the control unit 108 disables the operations of the robotic garden tool 202, if the robotic garden tool 202 is placed at a location which is not identified in the generated map.

The above parameters may be programmed into the control unit 108, and the control unit 108 further saves the parameters into the memory means 112.

Figure 3:
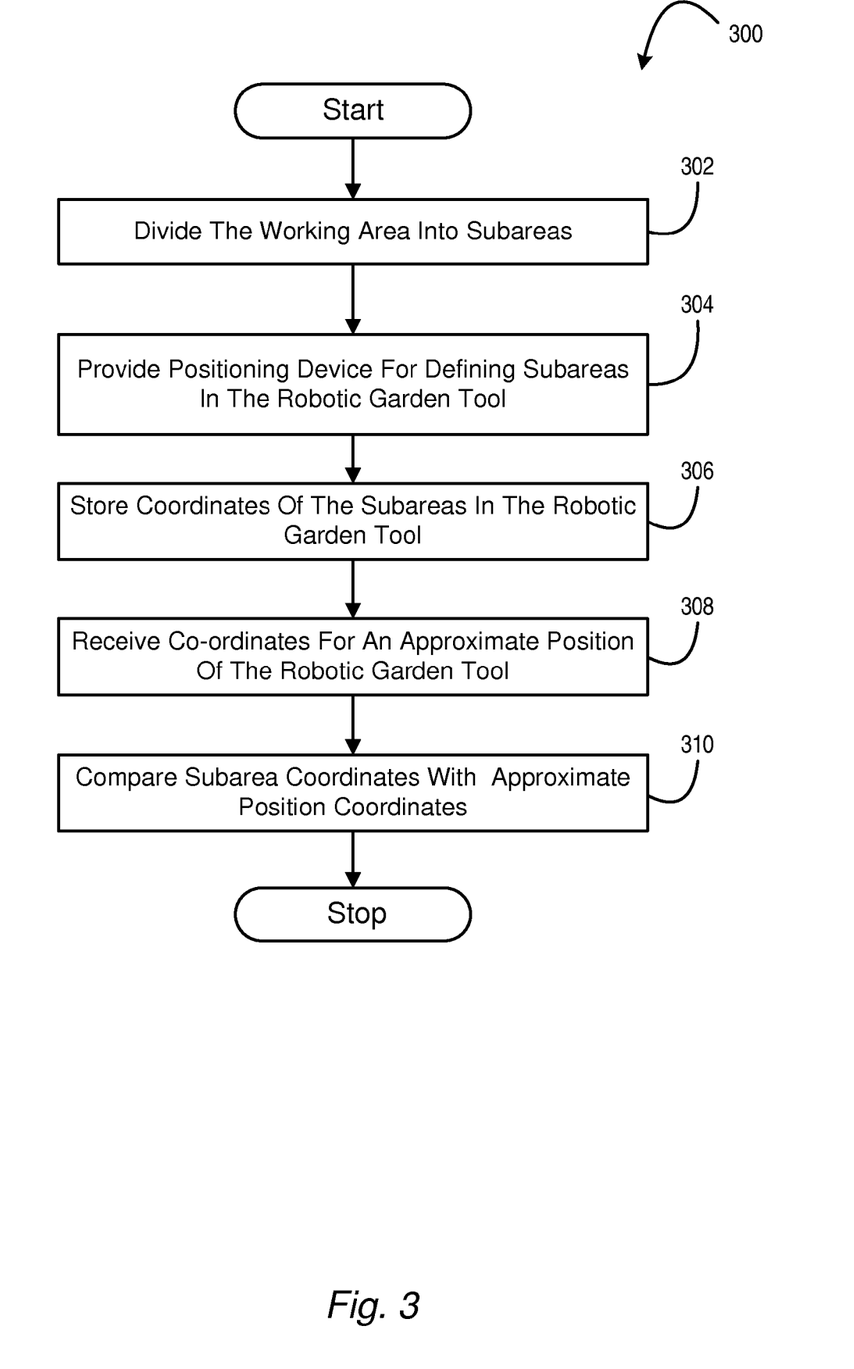
FIG. 3 is a flowchart for illustrating a method for navigating the robotic garden tool, according to an embodiment of the present invention.

FIG. 3 illustrates a flow chart of a method 300 for navigating a robotic garden tool in the working area, according to an embodiment of the present invention. In step 302, the working area 204 is divided into several subareas 210, 212, 214, 216, and 218. The working area 204 of the lawn 200 is defined by boundaries. The boundary defines the working area by means of physical fences, fixed objects, surface determination, a boundary wire or the like. The boundaries may be identified based on one or more signals 102 generated from a signal source 104. The signal source 104 is a wire, in particular the boundary wire 206 spread along the perimeter of the working area 204 in the lawn 200.

The robotic garden tool 202 includes a sensor unit 106, which is adapted to detect the one or more signals 102 from the signal source 104, as well as other physical objects like fences or fixed objects present in the lawn 200.

Further, in step 304, the robotic garden tool 202 is provided with the positioning device 110. The positioning device 110 may be a standard Global Positioning System (GPS) with low accuracy, or a Local Positioning System. In various embodiments of the present invention, the positioning device 110 may be any device which is capable of providing location based information to the robotic garden tool 202.

The positioning device 110 is adapted to provide position co-ordinates of the working area 204 based on which the working area 204 is defined into various subareas 210-218.

In step 306, the robotic garden tool 202 stores the position co-ordinates of the working area 204 in the memory means 112 of the control unit 108 provided in the robotic garden tool 202. Further, the robotic garden tool 202 also stores the converted electric signals received from the sensor unit 106.

The robotic garden tool 202 is adapted to generate a map of the lawn 202 based on the converted electric signals from the sensor unit 106 and the position co-ordinates of the working area 204 from the positioning device 110.

In step 308, the processor means 114 provided on the robotic garden tool 202 receives co-ordinates for an approximate position of the robotic garden tool 202 from the positioning device 110.

Further, in step 310, the processor means 114 compares the position co-ordinates of the subareas 210-218, based on which the map is generated, and the received approximate position of the robotic garden tool 202 to determine a location of the robotic garden tool 202 or especially in which subarea the robotic garden tool 202 is at present.

The processor means 114 generates one or more commands based at least in part on the location of the robotic garden tool 202 in the lawn 200. The one or more commands are based on one or more operating parameters defined for each of the subareas 210-218 in the lawn 200. The operating parameters are stored in the memory means 112. The operating parameters may include, but not limited to different cutting heights, certain order in which the subareas should be cut, a specific time in which a subarea should be cut, intervals at which a certain subarea should be cut, restricting the entry of the robotic garden tool 202 in certain subareas 210-218 at certain times and the like.

The control unit 108 is adapted to use the generated map and the current location of the robotic garden tool 202 to find a remote area where the robotic garden tool 202 should be moved. The remote area may be the charging station 220 for the robotic garden tool 202, when the battery of the robotic garden tool 202 falls below a pre-determined threshold.

Though the above mentioned invention explains the working with respect to robotic garden tool 202, a person skilled in the art may know that such a system may be easily implemented on other tools like, but not limited to, robotic lawnmower or automated vacuum cleaners.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method for navigating a robotic garden tool operating in a lawn within a predetermined working area defined by boundaries, which robotic garden tool is provided with at least one sensor unit configured to detect the boundaries, and wherein the robotic garden tool is configured to operate in the working area in an irregular pattern,
the method comprising:
dividing the working area into subareas;
providing the robotic garden tool with a low-accuracy positioning device for defining the subareas based on coordinates from the low-accuracy positioning device in the robotic garden tool;
storing the coordinates for the subareas in the robotic garden tool,
receiving coordinates for an approximate position of the robotic garden tool from the low-accuracy positioning device; and
providing the robotic garden tool with a processor for comparing the stored coordinates for the subareas, with the coordinates for an approximate position of the robotic garden tool from the low-accuracy positioning device, to determine in which subarea the robotic garden tool is at present.

2. A method according claim 1 further comprising providing the robotic garden tool with one or more operating parameters for each of the subareas.

3. A method according to claim 2, wherein the one or more operating parameters comprises cutting heights for each of the subareas.

4. A method according to claim 2, wherein the one or more operating parameters comprises a specific time at which each of the subareas is to be cut.

5. A method according to claim 2, wherein the one or more operating parameters comprises an order in which the subareas is to be cut.

6. A method according to claim 2, wherein the one or more operating parameters is the time intervals between successive cuttings for each of the subareas.

7. A method according to claim 2, wherein the one or more operating parameters comprises restricting the access of the robotic garden tool to different subareas at different times.

8. A method according to claim 1 further comprising generating a low-accuracy map of the working area based on the coordinates for the subareas and the boundaries.

9. A method according to claim 8, wherein the robotic garden tool is configured to use the generated map to find a remote area within the working area or a charging station within the working area.

10. A method according to claim 1, wherein the boundaries defines the working area via physical fences, fixed objects, a boundary wire, which boundary wire sends electrical signals, or through surface determination, wherein the at least one sensor unit on the robotic garden tool is configured to detect the boundaries.

11. A method according to claim 1, wherein the robotic garden tool is configured to perform irregular operation within a subarea before continuing to another subarea within the working area.

12. A system for navigating a robotic garden tool operating in a lawn within a predetermined working area defined by boundaries, which working area is divided into subareas, wherein the robotic garden tool) is configured to operate in the working area in an irregular pattern, the system comprising:
a signal source, configured to send one or more signals for defining the boundaries of the working area;
at least one sensor unit provided on the robotic garden tool to detect the boundaries based on the one or more signals provided by the signal source;
a low-accuracy positioning device for defining the subareas based on the coordinates from the low-accuracy positioning device, and wherein the low-accuracy local positioning device is further configured to provide an approximate position of the robotic garden tool in a subarea; and
a control unit provided on the robotic garden tool, where in the control unit comprises at least one processor and a memory;
wherein the processor is configured to compare the coordinates for the subareas with the coordinates for an approximate position of the robotic garden tool from the low-accuracy positioning device, to determine in which subarea the robotic garden tool is at present.

13. A system according to claim 12, wherein the control unit is configured to generate a map based on the coordinates from the low-accuracy positioning device and the one or more signals received from the signal source.

14. A system according to claim 12, wherein the control unit is configured to generate one or more commands based at least in part on the location of the robotic garden tool.

15. A system according to claim 12, wherein the low-accuracy positioning device is a standard GPS device.

16. A system according to claim 12, wherein the accuracy of the low-accuracy positioning device is less than ±10 m.

17. A system according to claim 12, wherein the accuracy of the low-accuracy positioning device is less than ±3 m.

18. A system according to claim 12, wherein the accuracy of the low-accuracy positioning device is less than ±1 m.

19. A system according to claim 12, wherein the accuracy of the low-accuracy positioning device is less than ±0.1 m.

20. A system according to claim 12, wherein the robotic garden tool is a robotic lawnmower.

* * * * *

UNITED STATES PATENT AND TRADEMARK OFFICE
CERTIFICATE OF CORRECTION

PATENT NO. : 8,938,318 B2  
APPLICATION NO. : 13/634974  
DATED : January 20, 2015  
INVENTOR(S) : Bergström et al.

Page 1 of 1

It is certified that error appears in the above-identified patent and that said Letters Patent is hereby corrected as shown below:

In the claims  
Column 10, Claim 12, Line 18 "wherein the robotic garden tool) is configured to operate in," should read --wherein the robotic garden tool is configured to operate in--.

Signed and Sealed this  
Twenty-third Day of February, 2016

Michelle K. Lee  
*Director of the United States Patent and Trademark Office*